June 9, 1959  L. N. DAVIS  2,890,057
BABY SEAT FOR TELESCOPING CART
Filed Sept. 9, 1957  3 Sheets-Sheet 1

INVENTOR.
LYNN N. DAVIS
BY
Woodhams Blanchard & Flynn
ATTORNEYS

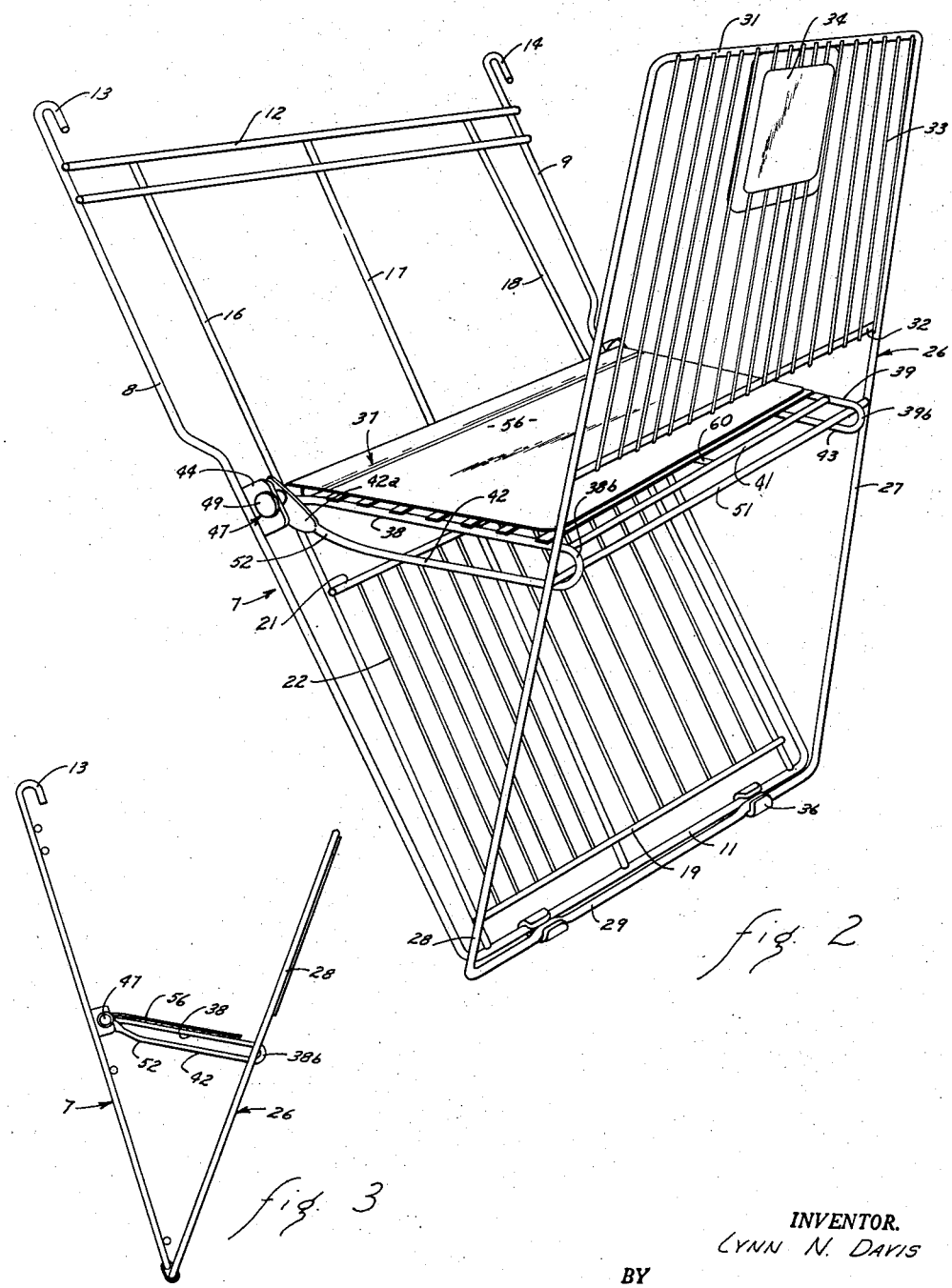

June 9, 1959 L. N. DAVIS 2,890,057
BABY SEAT FOR TELESCOPING CART
Filed Sept. 9, 1957 3 Sheets-Sheet 3
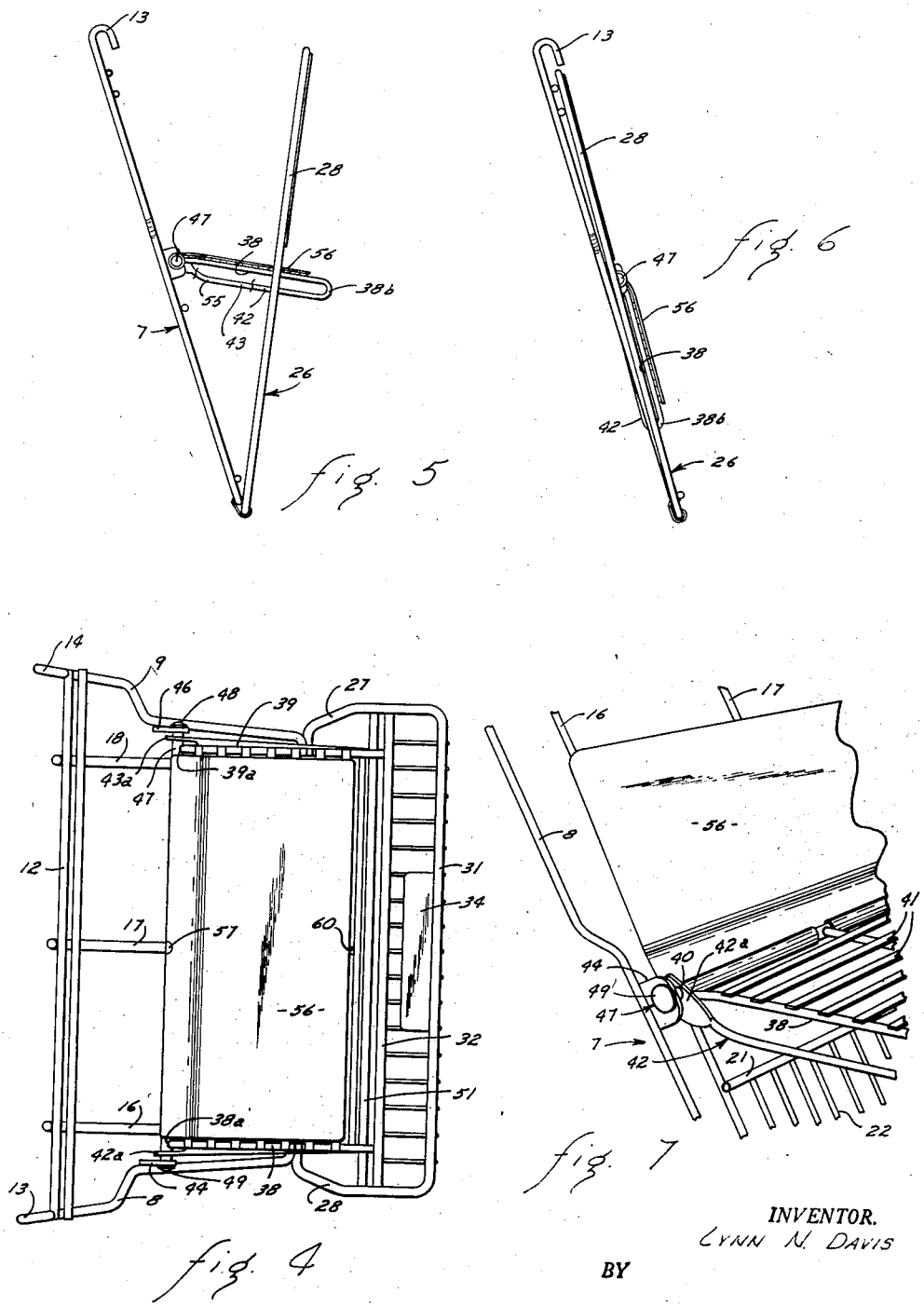
INVENTOR.
LYNN N. DAVIS
BY
Woodhams Blanchard & Flynn
ATTORNEYS

2,890,057

BABY SEAT FOR TELESCOPING CART

Lynn N. Davis, Calhoun, Mich., assignor to United Steel & Wire Company, Battle Creek, Mich., a corporation of Michigan Application September 9, 1957, Serial No. 682,653

11 Claims. (Cl. 280—33.99)

This invention relates to a baby seat and/or a small parcels compartment structure applicable to a grocery cart and, particularly, relates to such structure mountable on the swingable end panel normally closing the otherwise open end of a nestable type grocery cart.

Ever since the beginning of the use of wheel supported baskets, commonly called "grocery carts," in the supermarket type of retail establishment, the trade has been faced with the problem of providing means by which the shopper, often a housewife with a relatively young child, could transport the child with her conveniently and without either fatiguing herself or obstructing the shopping activities of other shoppers.

Further, even where a shopper does not find it necessary to carry a small child with her, it is often desirable to deposit a purse or other relatively small article or package in some convenient portion of the grocery cart for carrying same along during the shopping expedition and, hence, a suitable compartment in an otherwise standard grocery cart is desirable for this purpose.

However, the provision of such means is not desirable in a grocery cart as a rigid installation inasmuch as the special needs above mentioned are not present with all shoppers and, accordingly, the grocery cart should be made to be as adaptable as possible to the needs of the individual shopper, whether these needs involve the transportation of a child, the transportation of a purse or small article or package, or whether such needs involve no such requirements and it is desirable to utilize the full amount of space available within the grocery carrying compartment of the cart.

This general type of need has been recognized for many years and a number of attempts have been made previously to provide a device capable of conveniently carrying a baby, a purse, or other small article or package in a grocery cart. However, many of such designs have been unreasonably expensive and, in view of the large numbers in which grocery carts are manufactured, a saving of even a small amount per unit is extremely valuable, providing it can be accomplished without appreciable impairment of the operating characteristics of the apparatus involved. By the same token, it will be understood that, if a device can be designed which actually constitutes an improvement in operating characteristics, and also effects a reduction in the cost of the apparatus, such product will then be of extreme commercial value.

It is, accordingly, particularly desirable to provide apparatus applicable to the nestable type of grocery cart wherein such apparatus may be selectively activated or inactivated and, if activated, it may be conveniently utilized as a device for carrying a baby in reasonable comfort and with a high degree of safety or it may be utilized for carrying a purse or other type of small article or package, and wherein such apparatus will be convenient for the shopper to operate, foolproof in its operation, and inexpensive in its manufacture and maintenance.

Accordingly, a principal object of the invention is to provide a structure applicable for use with a grocery cart which may be selectively activated or inactivated and which, when activated, is effective for carrying a baby or for carrying any desired small package or article, such as a purse.

A further object of the invention is to provide a structure, as aforesaid, which is particularly applicable for use with the swingable end panel of the basket utilized in a nesting type of grocery cart.

A further object of the invention is to provide a structure, as aforesaid, which will not interfere with the swinging of the end panel of the basket in the nesting operation.

A further object of the invention is to provide a structure, as aforesaid, which can be readily moved from non-operative position to operative position, or vice versa, easily and by use of only one of the user's hands.

A further object of the invention is to provide a structure, as aforesaid, which, when placed in operative position, can be readily adjusted by only one of the user's hands for use either as a baby seat or as a small package container.

A further object of the invention is to provide a device, as aforesaid, which will be inexpensive to construct.

A further object of the invention is to provide a device, as aforesaid, which will be composed of a minimum of parts, and none of which parts is of particular complexity.

A further object of the invention is to provide a device, as aforesaid, which will be capable of withstanding hard usage without appreciably altering the ease and effectiveness of its operation.

A further object of the invention is to provide a device, as aforesaid, whose manner of use will be sufficiently obvious that it can be readily used by any casual shopper, substantially without instruction.

Further objects and purposes of the invention will be apparent to persons acquainted with apparatus of this general type upon reading the following disclosure and inspecting the accompanying drawings.

Referring now to the drawings:

Figure 2 is an oblique view of the device of the invention in operating position, but separate from the grocery cart.

Figure 3 is a side view of the device shown in Figure 2.

Figure 4 is a top view of the device shown in Figure 2.

Figure 5 is a view similar to Figure 3, but showing the device in a partially collapsed position.

Figure 6 is a view similar to Figure 3, but showing the device in a fully collapsed position.

Figure 7 is a fragment of the structure in Figure 2.

General description

Figure 1:
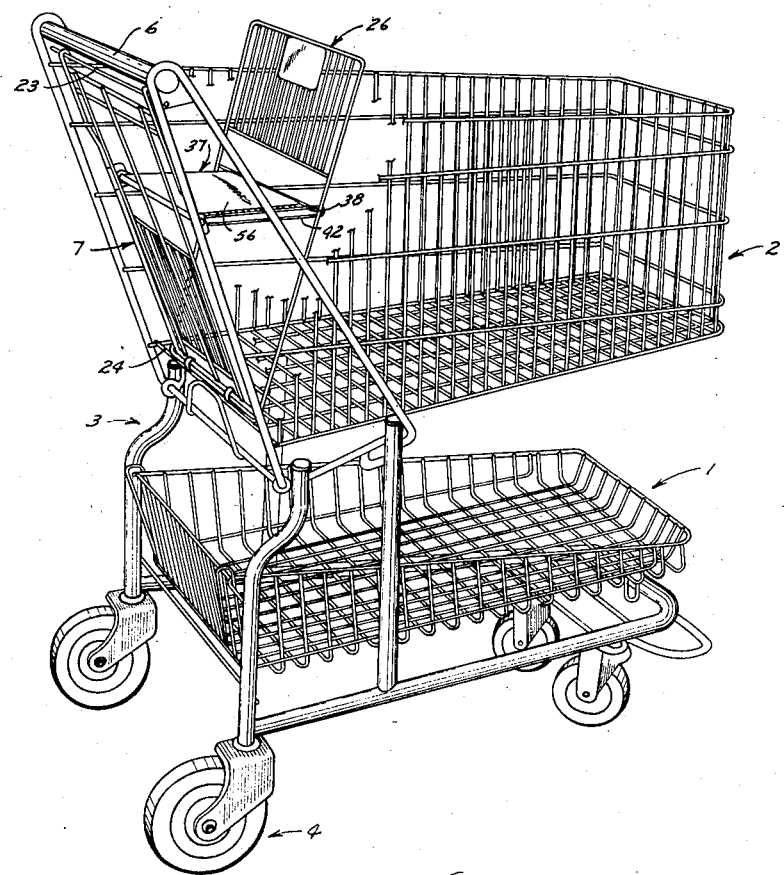
Figure 1 is an oblique, partially broken away, view of a grocery cart provided with the device of the invention.

In general, the structure of my invention includes a primary panel for closing the normally open rear end of a grocery cart basket, which panel is pivotally supported from its upper end in order that it can swing upwardly to permit nesting of the grocery carts in conventional fashion. A secondary panel is pivoted at its lower end to the lower end of the primary panel. A seat structure is pivotally affixed at its rearward edge to the primary panel at a point between the ends of the primary panel. The forward edge of the seat structure extends through the secondary panel and the seat structure is slidable therethrough. Limit means is provided on the secondary panel at a point on said secondary panel slightly closer to the lower edge thereof than the distance from the pivot point of the seat structure on the primary panel to the lower edge thereof. The limit means supports said seat structure and also effects pivotal movement of said seat structure with respect to said primary panel during the collapsing of said seat structure. Thus, when the secondary panel moves pivotally toward the primary panel, the seat is caused to swing downwardly and, when the secondary panel lies fully against the primary panel, the seat will lie flat against said secondary panel.

Detailed description

Turning now to a detailed description of the structure of the invention, the following terminology will be utilized for convenience in description, but no limiting significance shall be given to it. The term "rear," or derivatives thereof, will refer to the end of the shopping cart or to portions of the baby seat and small parcels compartment structure which is toward the person operating the cart, namely, the leftward end of the cart as appearing in Figure 1. The term "front," or derivatives thereof, and the term "forward," or derivatives thereof, will refer to parts of the grocery cart or to parts of the baby seat and small parcels compartment structure which are away from the person operating the cart, namely, the rightward end of the cart as appearing in Figure 1. The terms "upward" and "downward," or derivatives thereof, will refer to the structure in its normal position of operation.

Referring to the drawings, there is shown in Figure 1 a grocery cart of conventional construction, to which is applied a baby seat and small parcels compartment structure embodying the invention. It will be apparent from the description that the particular grocery cart structure here selected for illustrative purposes, while well adapted to employment with the structure of the invention, is by no means the only structure with which the baby seat and small parcels compartment structure of the invention can be utilized. Accordingly, it will be understood that the selection of this particular grocery cart is solely for illustrative purposes and in no sense limits the use of the structure of the invention thereto.

The grocery cart comprises a lower basket 1, an upper basket 2, and a frame structure 3 by which the upper and lower baskets are held in vertically spaced relationship to each other. The frame structure 3 also supports the baskets on conventional casters, of which one is indicated at 4, which casters enable the cart to be moved readily in a desired direction. A handle 6 is provided adjacent the rearward end of the upper basket 2 to enable the user of the cart to grasp it conveniently and to propel and control it, as desired.

The rearward (leftward, as appearing in Figure 1) end of the upper basket 2 is open insofar as the permanent structure comprising the other three sides and bottom of said upper basket 2 is concerned. In said otherwise open, rearward, end of said upper basket is hung a closure panel 7, also referred to herein as a "primary panel." Said closure panel 7 is provided with side bars 8 and 9 (Figure 2), which are connected together by a lower cross-bar 11 and by one or more upper cross-bars 12. In the particular embodiment of the invention herein illustrated, the lower cross-bar 11 is integral with the side bars 8 and 9 and the upper cross-bars 12 are welded in position. Hooks 13 and 14 are provided at the upper end of the respective side bars 8 and 9 for the purpose of supporting said closure panel 7 in operating position, as appearing hereinafter. A series, here three, of vertical closure bars 16, 17 and 18 extend from the cross-bar 11 to at least one of the upper cross-bars 12 and are fastened in position in any convenient manner, as by welding. Additional cross-bars 19 and 21 are provided at the lower end of said closure panel and at a point slightly below the middle of said closure panel, respectively. A plurality of further closure bars, of which one is indicated at 22, are provided between said two last-named cross-bars for the purpose of substantially closing the lower portion of panel 7. A support bar 23 (Figure 1) is provided at the upper end of the frame structure 3, immediately below the handle 6, for pivotally supporting the closure panel 7. Said closure panel 7 is made slightly longer than the clear open space at the rearward end of the upper basket 2, so that its lower end strikes the bottom of the said upper basket 2 and thereby limits the clockwise (as appearing in Figure 1) rotation of said closure panel 7 about the support bar 23. Thus, as has been previously known, the closure panel 7 will, by its own weight, move about the support bar 23 into a closed position, as shown in Figure 1, but when the grocery carts are to be nested, it can be caused to move counterclockwise (as appearing in Figure 1) about said support bar 23 into an upward position and thereby permit the entry of the rightward end of the upper basket of another similarly constructed grocery cart into the rearward end of the given grocery cart under consideration.

All of the construction described thus far has been previously known and forms no part of the present invention, as such. It is described and illustrated herein solely for convenience in understanding the invention and it may be varied materally without affecting the applicability thereto of the structure of the invention.

Referring now to the structure specifically illustrating and embodying the invention, there is provided a forward, or secondary, panel 26 comprising side bars 27 and 28, a lower cross-bar 29, and an upper cross-bar 31. Said side bars and said cross-bars are preferably all formed from a single piece of rod material, with the ends thereof welded together. A further cross-bar 32 is provided at a point somewhat above the midpoint of the secondary panel 26 and is preferably welded in position. A plurality of vertical closure bars, of which one is indicated at 33, are provided between the upper cross-bar 31 and the further cross-bar 32 for the purpose of substantially closing the upper end of the secondary panel 26. A name plate 34 may also be provided, if desired. The lower cross-bar 29 is pivotally fastened to the lower cross-bar 11, in any convenient manner, such as by conventional clamps, of which one is indicated at 36, for permitting pivotal motion of said primary and secondary panels toward and away from each other. However, it will be understood that other pivoting devices may be provided, as desired, and that the particular method of pivotally attaching the lower ends of said panels to each other forms no part of the invention, as such.

It will be noted that the lower portion of the secondary panel 26 is, in this embodiment, left open. This is desirable in order to permit maximum utilization of the space within the upper basket 2 of the grocery cart, but the existence, as such, of said opening in the lower end of the secondary panel is not essential to the invention and it may be closed in a manner similar to the closure of the upper end of said secondary panel, if desired, insofar as the present invention is concerned.

A seat structure 37 is mounted to assume its operating position when the panels are moved pivotally away from each other to the position shown in Figures 2 and 3 and to assume a collapsed position when the panels are moved pivotally toward each other, the seat structure being shown partially collapsed in Figure 5 and fully collapsed in Figure 6.

Said seat structure 37 includes a first side rod 38 and a second side rod 39 (Figure 2). A plurality of seat cross-bars, of which certain ones appear at 41 (Figures 2 and 7), extend between the side rods 38 and 39 and are affixed thereto in any convenient manner, as by welding. Sufficient of said cross-bars are utilized to provide a reasonably firm and comfortable seat and to prevent small articles from falling therebetween. In practice, a one inch spacing has been found to be satisfactory.

A pair of guide bars 42 and 43 are provided substantially parallel with the side bars 38 and 39, respectively. Said guide bars are affixed rigidly with respect to said side bars at their respective ends. In this particular embodiment, this is accomplished by making said guide bars integral at their forward ends with said side bars and by providing structure, detailed further hereinafter, at their rearward ends for engaging the rearward seat supporting means, also detailed further hereinafter.

For supporting said seat 37 in position, there is provided a pair of ears 44 and 46 (Figures 4 and 7) fastened to, and extending forwardly from, the side bars 8 and 9, respectively. A pivot bar 47 extends through, and between, said ears and is provided with heads 48 and 49 at its ends to hold said pivot bar firmly against longitudinal movement with respect to the ears 44 and 46. The rearward ends of the side bars 38 and 39 are fastened directly to said pivot bar, conveniently by welding, as best shown at 38a and 39a in Figure 4. The rearward ends of the guide bars 42 and 43 are, in this embodiment, flattened, as indicated at 42a in Figures 2 and 7 and at 43a in Figure 4. Said flattened portions are each provided with an opening 40 (Figure 7) therethrough for the passage of the pivot rod 47 therethrough. Thus, the entirety of the seat structure 37 is mounted for pivotal movement around the axis of the pivot rod 47, and an uninterrupted slot is provided on either side of said seat structure between the side bars 38 and 39 and the guide bars 42 and 43, said slots extending substantially from the forward to the rearward edge of said seat structure.

A limit bar 51 extends between the side bars 27 and 28 of the secondary panel 26 and is fastened to said side bars in any convenient manner, such as by welding. Said limit bar 51 is spaced a distance from the end bar 29, which distance is slightly less than the distance from the pivot bar 47 to the end bar 11, the amount of such difference being as little as possible but still sufficient to permit the apparatus to operate in the manner set forth more fully below. The ends 38b and 39b of the side bars 38 and 39, by which said side bars and the guide bars 42 and 43 are connected to each other, encircle the limit bar 51 for the purposes appearing hereinbelow.

It will be seen in Figures 3 and 5 that the side bars 38 and 39 and the guide bars 42 and 43 are parallel to each other throughout the greater portion of their extent. However, the guide bars 42 and 43 are each bent upwardly, at the points 52 and 55, respectively, thereon, and from said points the guide bars 42 and 43 extend directly toward the pivot rod 47 for engagement thereof, as above described.

It will be observed that the relative spacing of the limit bar 51 and the pivot rod 47 from the end rods 29 and 11, respectively, is such that the limit bar 51 will occupy approximately the position adjacent the points 52 and 55 when the parts are in a collapsed position shown in Figure 6.

If desired, a sheet member 56 may be utilized to render the seat more comfortable or, alternatively, to close the upper part of the rearward, primary, panel. The sheet 56 is of a size approximately equal to the area of the seat and extends to, and is pivoted around (Figure 7), the pivot rod 47. A cutout is provided at 57 (Figure 4), to permit the sheet 56 to clear the center support rod 60 (Figures 2 and 4) of the seat structure as said sheet rotates counterclockwise (as appearing in Figures 2 and 3) about the pivot rod 47.

Said sheet 56 may be used in the position shown in Figures 2 and 3 and, if so used, it will render the seat somewhat more comfortable than when the seat is comprised solely of the cross-rods 41. Alternatively, the sheet 56 may be rotated in a counterclockwise direction to occupy a position lying against the rods 16, 17 and 18 and, in such case, the openings between said rods will be closed and the function of the apparatus as a small parcels carrier will be materially improved.

*Operation*

The operation of the structure above described will be evident to anyone acquainted with devices of this general type, but it will be reviewed hereinafter for the purpose of insuring a complete understanding of the invention.

Starting with the device in the position shown in Figures 1, 2 and 3, namely in its operating position, it will be apparent that small parcels may be placed on the seat 37, or a small child may be placed on the seat, with the child's legs extending through the openings between the bars 16 and 17 and between the bars 17 and 18. In such position, the apparatus is fully stable and there is no possibility of its collapsing with the parcels or child in it and, further, there is no reasonable likelihood of the child inserting his fingers into a location where they might conceivably become pinched.

Now, assuming that the device is to be collapsed into the position shown in Figure 6, it is necessary only for the operator to grasp the upper end of the secondary panel 26 and pull it rearwardly toward the upper end of the primary panel 7, thereby causing the limit bar 51 to move rearwardly. As the limit bar 51 moves rearwardly, it swings in an arc of shorter radius than the distance from the cross-bar 11 to the pivot rod 47. During the initial part of its swinging movement the limit bar 51 will usually be adjacent side bars 38 and 39 and no pivotal movement of the seat structure 37 will occur. Further movement of the limit bar 51 will cause it to cross over from the position adjacent side bars 38 and 39 to a position adjacent the points 52 on the guide bars 42 and 43. During this cross-over the seat structure 37 may move somewhat in a clockwise direction (as appearing in Figures 3 and 5) in response to gravity, since the seat structure 37 is not at that time supported by bar 51. When the limit bar 51 bears against the guide bars 42 and 43 adjacent the points 52 and 55, continued pivotal movement thereof positively urges the seat 37 in said clockwise direction. As the seat 37 approaches the fully collapsed position, the offset shape of the guide bars 42 and 43 at the points 52 and 55 therein will cause the major portion of said guide bars 42 and 43 to be moved between the rods 8 and 16 on the one side of the primary panel and between the rods 18 and 9 on the other side of said primary panel, respectively. This insures that the seat structure will take a position substantially fully parallel with the side rods 8 and 9 of said rearward panel and will thus permit the secondary panel 26 to lie flat against the primary panel 7.

Thus, the collapse of the seat structure is caused to occur quickly and easily and without any reasonable likelihood of sticking or malfunctioning. In this position, the secondary panel 26 and the seat structure 37 will follow the primary panel 7 as it moves upwardly around its supporting rod 23 in a nesting operation, as above mentioned.

For returning the seat structure into operating position, the secondary panel is urged forwardly by engaging its upward end and moving it forward. This reverses the collapsing action above described and lifts the seat into the position shown in Figures 1, 2 and 3.

Although a particular preferred embodiment of the invention has been disclosed hereinabove for illustrative purposes, it will be understood that variations of such disclosure, which lie within the scope of the appended claims, are fully contemplated.

I claim:
1. In a grocery cart construction, said cart having an open rear end and pivot means adjacent the upper part of said open rear end for supporting a swingable panel structure, the combination comprising: a primary panel structure for closing said rear end and means mounting said primary panel structure on said pivot means for enabling said primary panel structure to pivot from a position closing said open rear end into a position opening same to permit nesting of two or more of such carts, a secondary panel structure and panel pivot means piv- otally affixing said primary panel structure to said secondary panel structure at the lower end of each thereof; limit means on said secondary panel structure intermediate the ends thereof and extending substantially parallel with the pivotal axis of said panel pivot means; a seat having first and second opposite and parallel edges arranged parallel with said panel structures and seat pivot means whose pivotal axis is parallel with the pivotal axis of said panel pivot means pivotally affixing said first edge to said primary panel structure intermediate the ends of said primary panel structure, said limit means supporting said seat in a substantially horizontal position when said panel structures are spaced apart; a guide extending from said second edge around said limit means and back in a direction substantially parallel with said seat toward said primary panel structure, the portion of said guide parallel with said seat being spaced from said seat and said limit means being received between said guide and said seat and being movable with respect to said guide and said seat toward and away from said primary panel structure, said limit means being guided in such movement by said guide, said limit means being at a slightly different distance from the pivotally connected ends of said panel structures than said seat pivot means; means on said secondary panel structure defining an opening therethrough above said limit means through which said seat may move, whereby moving the upper ends of said panel structures apart will place said seat in a substantially horizontal position between said panel structures and moving the upper ends of the said panel structures together will move said seat through said opening and pivot said seat into a position on the opposite side of said secondary panel structure from said primary panel structure and substantially parallel with said panel structures.

2. The device defined in claim 1 wherein said limit means is closer to the pivotal connection of said panels than is said seat pivot means, whereby movement of the upper ends of said panels together will move the second edge of said seat downwardly toward the lower end of said panel structures so that said seat will hang downwardly when said panel structures are adjacent each other.

3. The device defined in claim 1 including article-retaining structure substantially closing the upper end of said secondary panel structure and spaced sufficiently above said limit means to permit movement of said seat therebetween.

4. The device defined in claim 1 wherein said guide extends to a point at least adjacent the first edge of said seat.

5. The device defined in claim 1 having also a substantially imperforate package-retaining panel pivotally affixed to the first edge of said seat structure and adapted to cooperate with said structure when in its raised position for forming a small package-retaining compartment, and means on said first panel structure limiting angular movement of said package-retaining panel in a direction away from said seat structure to a position substantially parallel with said first panel structure.

6. In a grocery cart construction, said cart having an open rear end and pivot means adjacent the upper part of said open rear end for supporting a swingable panel structure, the combination comprising: a primary panel structure for closing said rear end and means mounting said primary panel on said pivot means for enabling said primary panel structure to pivot from a position closing said open rear end into a position opening same to permit nesting of two or more such carts; a secondary panel structure and panel pivot means pivotally affixing said primary panel structure to said secondary panel structure at the lower end of each thereof; a seat and seat pivot means on said primary panel structure between the upper and lower ends thereof mounting said seat thereon for pivotal movement about a substantially horizontal axis; a substantially horizontally extending limit means on said secondary panel structure between the upper and lower ends thereof for supporting said seat in a substantially horizontal position when said secondary panel structure is in its remote position with respect to said primary panel structure; guide means secured to said seat and encircling said limit means and extending toward said seat pivot means, said guide means guiding movement of said limit means toward and away from said primary panel structure and limiting movement of said primary and secondary panel structures away from each other when same are in their mutually remote positions and permitting movement of said panels toward each other into their mutually adjacent positions; a pair of upwardly extending means on said secondary panel structure spaced apart further than the side edges of said seat; horizontally extending means on said secondary panel structure spaced vertically from said limit means, said upwardly extending means, said horizontally extending means and said limit means defining an opening through which said seat may move in a horizontal direction whereby movement of the upper ends of said panel structures away from each other will place said seat in a substantially horizontal position between said panel structures and movement of the upper ends of said panel structures together will move said seat through said opening into a position on the opposite side of said secondary panel structure from said primary panel structure.

7. A grocery cart comprising: a frame; a container mounted on said frame, said container having a rear closure panel; a secondary panel pivotally connected at its lower end to said closure panel so that the upper ends of said panels may be moved toward and away from each other; a seat disposed between said panels and means pivotally connecting said seat to said rear closure panel intermediate the upper and lower ends thereof for pivotal movement about a horizontal axis; means engaging said rear panel and said secondary panel for limiting movement of said panels away from each other and for permitting said panels to move toward each other; substantially horizontally extending support means secured to said secondary panel intermediate the upper and lower ends thereof for supporting said seat in a substantially horizontal position when said panels are in spaced-apart relationship and for permitting said seat to pivot about said horizontal axis when said secondary panel is moved toward or away from said rear closure panel; means defining an unobstructed opening through said secondary panel; said opening being at least as wide as said seat and being adapted for receiving said seat therethrough so that said seat may move substantially forwardly and downwardly therethrough when said panels are moved toward each other.

8. An end gate for a nesting type grocery cart, comprising: a rear closure panel adapted to be pivotally connected at its upper end to a grocery cart; a secondary panel pivotally connected at its lower end to said rear closure panel so that the upper ends of said panels may be moved toward and away from each other; a seat disposed between said panels and seat pivot means pivotally connecting said seat to said closure panel intermediate the upper and lower ends thereof for pivotal movement about a horizontal axis; substantially horizontally extending support means secured to said secondary panel intermediate the upper and lower ends thereof for supporting said seat in a substantially horizontal position when said panels are in spaced apart relationship, said support means being spaced a slightly lesser distance from the lower ends of said panels than said seat pivot means and being located below said seat when said panels are in spaced apart relationship; guide means secured to said seat and encircling said support means and extending therefrom substantially to said seat pivot means, said guide means being below and spaced from said seat and said support means being received between said guide means and said seat, said guide means guiding movement of said support means toward and away from said closure panel and being engageable by said support means when said panels are moved toward each other so that said seat is urged downwardly thereby; means defining an unobstructed opening through said secondary panel, said opening being at least as wide as said seat and said support means defining the lower edge of said opening so that said seat may move substantially forwardly and downwardly therethrough when said panels are moved toward each other and may pivot downwardly about said horizontal axis so that when said panels are adjacent each other, said seat is positioned on the side of said secondary panel remote from said closure panel and extends toward the lower end thereof.

9. An end gate for a nesting type grocery cart as defined in claim 8 wherein said seat pivot means includes a horizontally extending pivot shaft offset from the plane of said rear closure panel toward said secondary panel; ears secured to said rear closure panel and extending toward said secondary panel for supporting said shaft in said offset position whereby the pivot axis of said seat is offset from said closure panel so that said seat may occupy a position substantially parallel to said closure panel.

10. An end gate for a nesting type grocery cart as defined in claim 8 wherein said guide means includes rods shaped in the form of substantially closed loops encircling said support means at one end thereof and secured to said seat pivot means at the other end thereof, the upper side of said rods being secured to the lower surface of said seat at spaced locations thereon and the lower side of each loop being spaced downwardly from said seat and being engageable with said support means when said panels are moved toward each other.

11. An end gate for a nesting type grocery cart as defined in claim 8 wherein said support means is a horizontally extending rod positioned below said seat; said secondary panel including means defining a back rest located above said rod; said last named means and said rod being spaced vertically from each other and defining, respectively, the upper and lower edges of said opening.

References Cited in the file of this patent

UNITED STATES PATENTS

| | | |
|---|---|---|
| 2,689,133 | Goldman | Sept. 14, 1954 |
| 2,769,645 | Young | Nov. 6, 1956 |
| 2,813,725 | Hoedinghaus et al. | Nov. 19, 1957 |
| 2,860,885 | Schweitzer | Nov. 18, 1958 |